US008144029B2

(12) United States Patent
Habetha et al.

(10) Patent No.: US 8,144,029 B2
(45) Date of Patent: Mar. 27, 2012

(54) EVENT-TRIGGERED COMMUNICATION BETWEEN NODES HAVING A TRANSMITTER SENDING AN IDENTIFYING MESSAGE AND ACKNOWLEDGING NOTIFICATION

(75) Inventors: Jorg Habetha, Aachen (DE); Marco Ruffini, Dublin (IE)

(73) Assignee: NXP B.V., Eindhoven (NL)

( * ) Notice: Subject to any disclaimer, the term of this patent is extended or adjusted under 35 U.S.C. 154(b) by 686 days.

(21) Appl. No.: 11/719,210

(22) PCT Filed: Oct. 27, 2005

(86) PCT No.: PCT/IB2005/053509
§ 371 (c)(1),
(2), (4) Date: Apr. 24, 2009

(87) PCT Pub. No.: WO2006/051436
PCT Pub. Date: May 18, 2006

(65) Prior Publication Data
US 2009/0207005 A1 Aug. 20, 2009

(30) Foreign Application Priority Data

Nov. 11, 2004 (EP) ................................. 04105688

(51) Int. Cl.
*G08B 21/00* (2006.01)
(52) U.S. Cl. .......... 340/902; 340/905; 455/517; 370/351
(58) Field of Classification Search .................. 340/902, 340/901, 903, 904, 905; 455/11.1, 517, 456.1, 455/562.1; 370/235, 254, 351
See application file for complete search history.

(56) References Cited

U.S. PATENT DOCUMENTS

| 6,721,537 | B1 | 4/2004 | Briesemeister |
| 2003/0095504 | A1 | 5/2003 | Ogier |
| 2003/0236860 | A1 | 12/2003 | Yegin |

FOREIGN PATENT DOCUMENTS

| EP | 1276336 A | 1/2003 |
| WO | 0223833 A2 | 3/2002 |
| WO | 03105502 A1 | 12/2003 |

*Primary Examiner* — Jeffery Hofsass

(57) ABSTRACT

In order to provide a device (100) as well as a method for event-triggered communication between and among a plurality of nodes (A, B, C, S), in particular between and among a plurality of mobile nodes, for example between and among a plurality of vehicles, where the aspect of acknowledging the messages is taken into consideration, it is proposed to address at least one message (M1, M2, M3), in particular at least one identifying message (IM) and/or at least one acknowledging notification (AM), to at least one specific node (A, B, C, S), in particular by way of unicast transmission.

20 Claims, 3 Drawing Sheets

Figure 1:
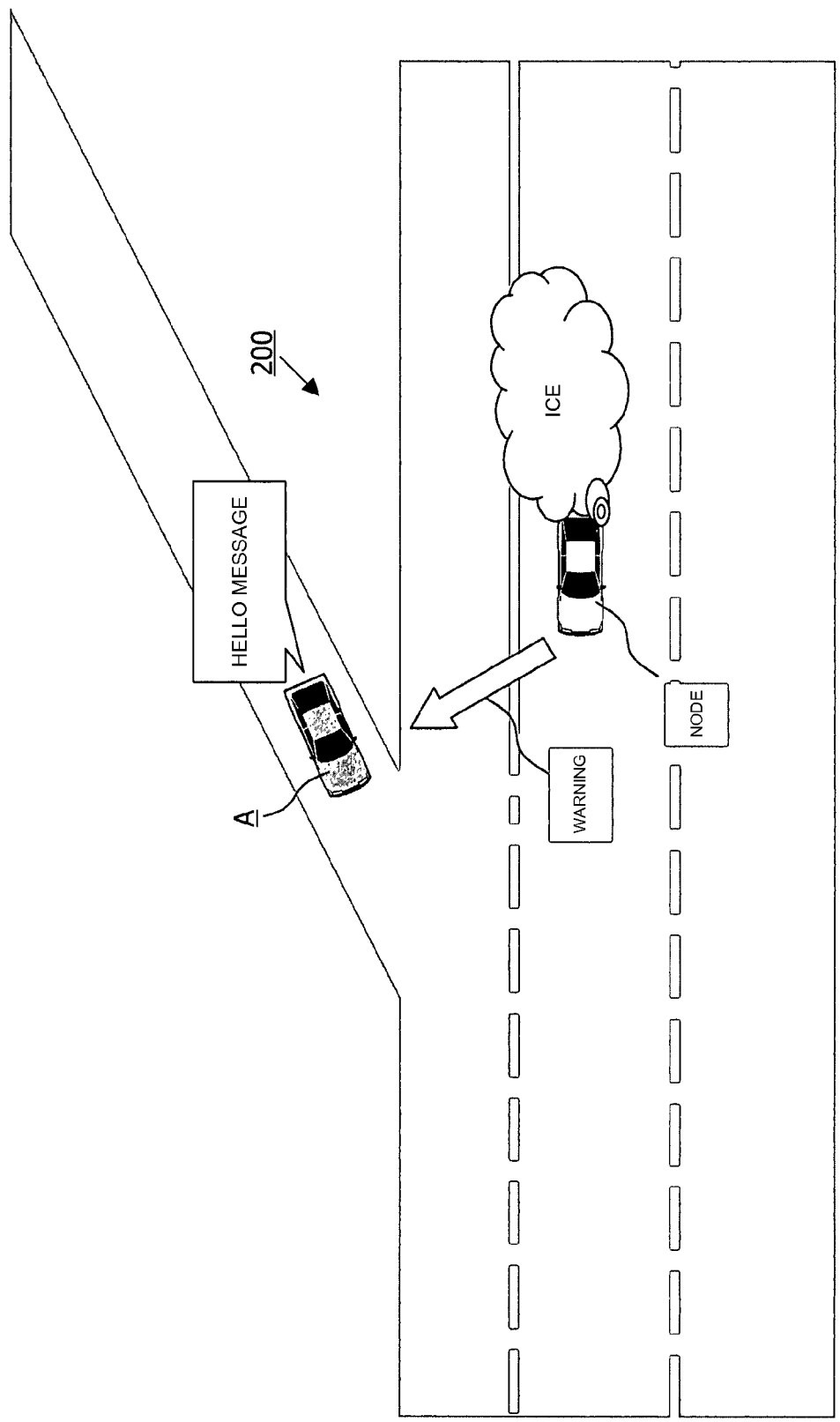

EVENT-TRIGGERED COMMUNICATION BETWEEN NODES HAVING A TRANSMITTER SENDING AN IDENTIFYING MESSAGE AND ACKNOWLEDGING NOTIFICATION

The present invention relates to a device for operating event-triggered communication between and among a plurality of nodes as well as to a method for event-triggered communication between and among a plurality of nodes, in particular between and among a plurality of mobile nodes, for example between and among a plurality of vehicles.

There are many applications, for example danger warning systems, where it has to be ensured that the notification is received by at least one other device in the neighbourhood. For this purpose, a broadcast message is not reliable enough because such broadcast message is in general not acknowledged. Furthermore, broadcast messages suffer from the disadvantage that they can result in a so-called broadcast storm in case the notification message should be distributed in the network.

With regard to the related prior art of event-triggered messages to notify the occurrence of an event to neighbour nodes, reference can be made to prior art document EP 1 276 336 A2 according to which it is provided for delivering information, such as a notification or other content, to a selected communication device when defined event and location criteria are satisfied. A profile is established to define the event and location criteria along with a method for delivering the information. Typically, the receipt of event indicia indicating the occurrence of an event is compared with the event criteria in the profile. When the event indicia satisfies the event criteria, location indicia is gathered and compared with the defined location criteria. Alternatively, a trigger corresponding to location is received and compared with the location criteria before determining whether an event corresponding to the event criteria is satisfied. When both the event occurrence and location indicia match the event and location criteria, the information is sent to the appropriate communication device.

However, the aspect of acknowledging the messages is not taken into consideration in prior art document EP 1 276 336 A2.

Starting from the disadvantages and shortcomings as described above and taking the prior art as discussed into account, an object of the present invention is to provide a device as well as a method for event-triggered communication between and among a plurality of nodes where the aspect of acknowledging the messages is taken into consideration.

The object of the present invention is achieved by a device comprising the features of claim 1 as well as by a method comprising the features of claim 9. Advantageous embodiments and expedient improvements of the present invention are disclosed in the respective dependent claims.

The present invention makes use of so-called "hello messages". Such messages are known in prior art mainly as a means for devices discovery and in routing algorithms to verify the existence of a link between two devices. The present invention uses hello messages for similar purposes but combines them with a method for reliable and efficient broadcast data delivery.

Hence the present invention is principally based on the idea of event-triggered messages to notify the occurrence of an event to neighbour nodes wherein the event notification is in particular triggered by incidents around the node or in the node. In this context, the use of acknowledged unicast messages in the event notification ensures a reliable communication, in particular an improved reliability compared to broadcast messages. For these reasons, acknowledged unicast messages are used in the present invention.

In order to avoid maintaining any network topology information in the nodes, the present invention proposes the use of periodic hello messages for identification and/or for confirmation to other nodes. These hello messages are transmitted periodically by all devices. In case an event happens and the respective device according to the present invention is triggered, said device listens for any hello message of other devices. If a hello message from a second device is detected by considered first device, the first device transmits the notification and/or data to this second device, in particular on a unicast link.

In order to prevent the first device from transmitting the notification repeatedly, each time a hello message is received from respective second device, the first device stores that the second device has already been informed about the event. It is a matter of parametrisation how many other devices are informed by this procedure about the event.

In the following, a preferred example of the method according to the present invention is disclosed:

All network devices periodically transmit hello packets including their identifier in order to inform other devices about their presence. Upon reception of an event notification and associated data, the following actions are carried out:

listening to the hello messages of other devices;

locally storing the identifiers of a certain number of other devices, from which hello packets have been received;

transmitting the notification and associated data to said other devices and waiting for an acknowledgement;

locally storing for each of said other devices whether an acknowledgement of a specific notification has been received whereby distinguishing between different notification messages;

repeating the transmission in case that no acknowledgement has been received within a certain time-out period; and deleting the information regarding a certain device if no hello packet has been received from this device within a certain lifetime.

A few of the above-mentioned steps of the present invention are known from prior art documents WO 02/23833 A2 and WO 03/105502 A1, but the respective method as disclosed in these prior art documents is not event-triggered and therefore not relevant for the present invention.

According to a preferred embodiment of the present invention, the local information on devices from which hello packets have been received is built and stored on demand once an event has happened respectively a notification message is received. In connection therewith or independently thereof, the local information on devices from which hello packets have been received can be permanently maintained and updated.

According to an essential feature of the present invention, the transmission of a notification and of associated data is carried out in unicast mode, i.e. separately for each selected device from which a hello packet has been received. In connection therewith or independently thereof, the notification can be sent to other devices in broadcast mode.

Preferably, the above-mentioned time-out period after which a transmission is repeated is equal to the period of hello packet transmission of the device from which the acknowledgement is expected. In connection therewith or independently thereof, the above-mentioned lifetime after which information regarding a device is deleted is equal to the maximal period of hello packet transmissions of the device or a multiple thereof according to the present invention.

According to a preferred embodiment of the present invention, a received notification is forwarded to a certain number of other devices; in particular, the notification is sent and forwarded to all devices for which the reception of a hello packet is still stored locally but not marked as acknowledged, except to the device from which the notification was received.

The present invention further relates to a reliable event-triggered communication network or communication system comprising at least one device as described above as well as to a corresponding communication protocol. The communication protocol is suited for all applications where an event or a user interaction triggers the device according to the present invention to transmit data to a neighbouring device. In the simplest case, the data consists of a notification that the respective event has happened.

The present invention finally relates to the use of at least one device as described above and/or of the method as described above and/or of the communication protocol as described above for communicating external data and/or events to other nodes in at least one communication network as described above, for example in a wireless vehicle-to-vehicle communication network, wherein accidents or other dangerous events automatically trigger warnings that are transmitted to other vehicles in the surroundings, especially in order to avoid collisions during lane change or merge manoeuvres and for reporting of invisible obstacles, for example ice on the road or obscured objects or shadowed objects, when vehicles are moving in different directions within the same area.

Figure 2:
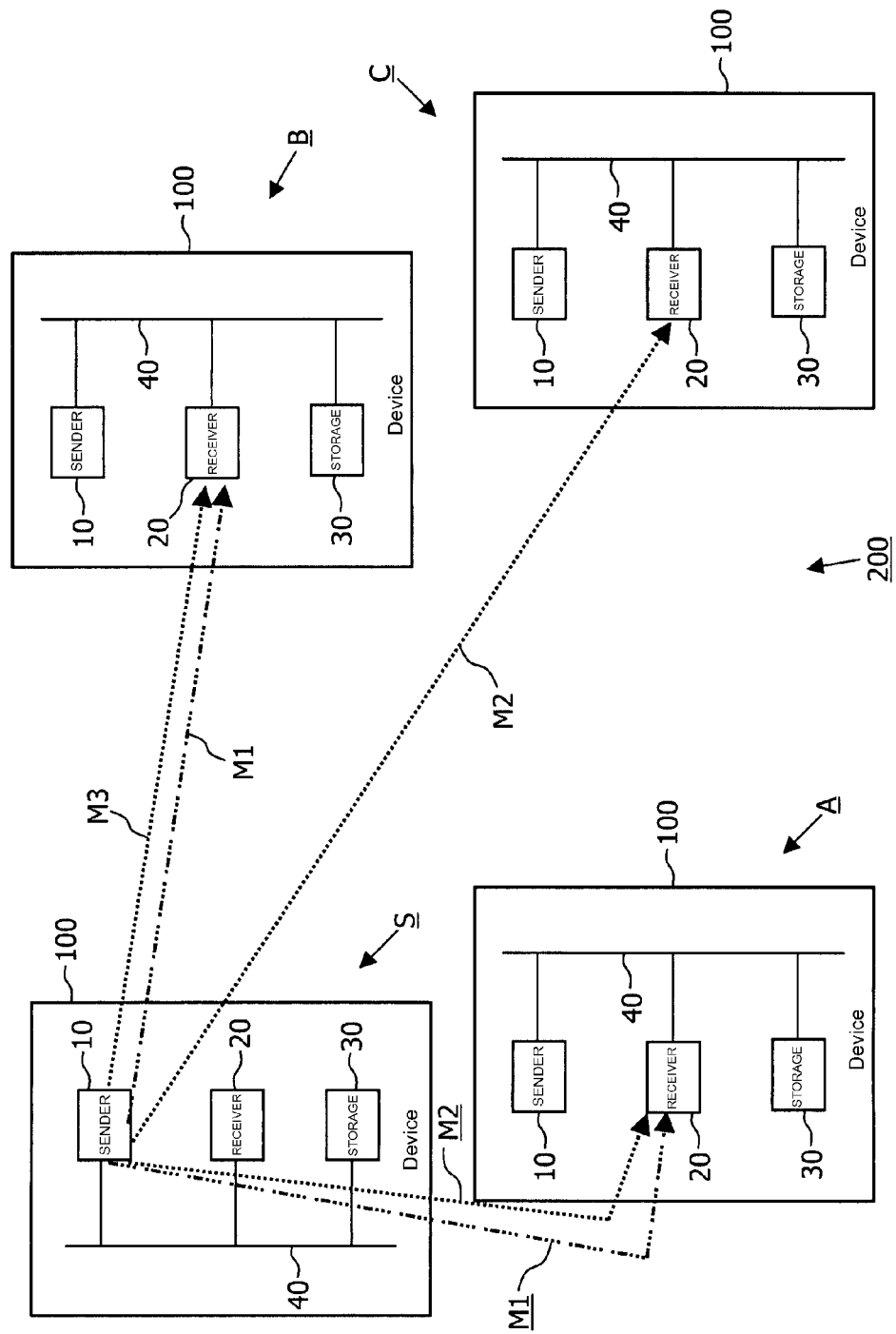
Figure 3:
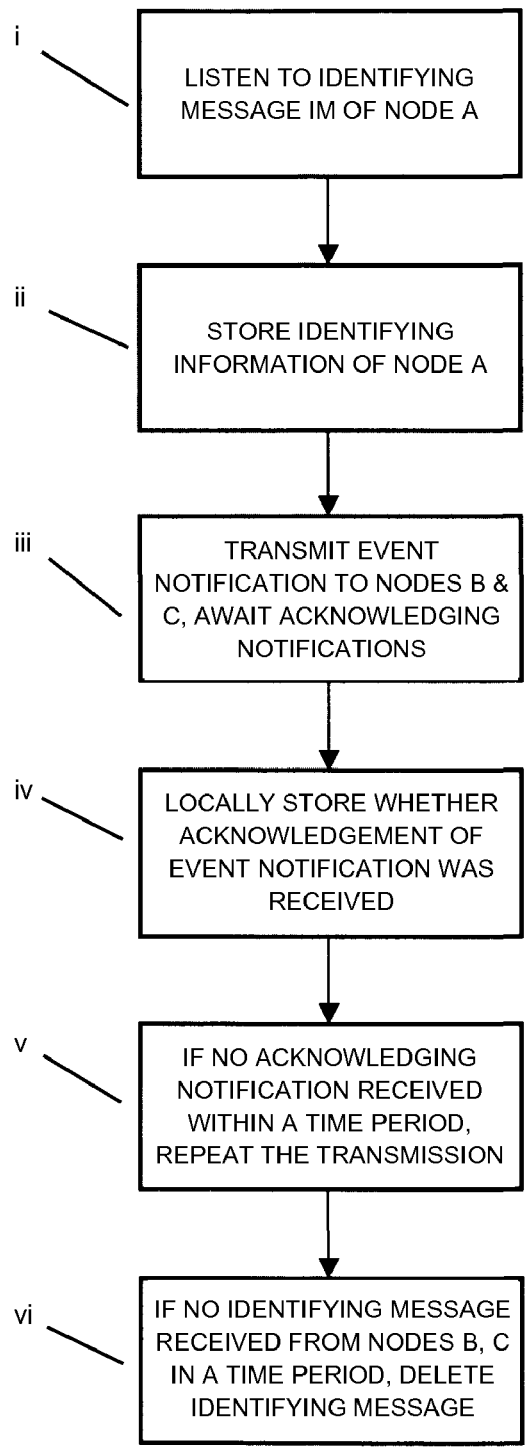

As already discussed above, there are several options to embody as well as to improve the teaching of the present invention in an advantageous manner. To this aim, reference is made to the claims dependent on claim 1 and on claim 9; further improvements, features and advantages of the present invention are explained below in more detail with reference to a preferred embodiment (cf. FIG. 1 to FIG. 3) by way of example and to the accompanying drawings where FIG. 1 schematically shows an embodiment of a communication system according to the present invention being operated according to the method of the present invention;

FIG. 2 schematically shows the communication system of FIG. 1 in more detail, i.e. in particular with four embodiments of the device according to the present invention; and FIG. 3 schematically shows an embodiment of a flow-chart of the method according to the present invention.

The same reference numerals are used for corresponding parts in FIG. 1 to FIG. 3.

There are many applications where either an external event or a user interaction triggers a communication to happen. An example of an event-triggered network is any kind of sensor network where external data or events have to be communicated to other nodes in the network. An example application is a wireless vehicle-to-vehicle communication network 200, in which accidents or other dangerous events automatically trigger warnings that are transmitted to other vehicles in the surroundings.

FIG. 1 shows such an example of an arrangement for an inter-node communicating system, namely a car-to-car communication system 200, according to the present invention; in more detail, an application scenario concerning a local danger warning by vehicle-to-vehicle communication is depicted in FIG. 1, wherein devices 100 according to the present invention are mounted on vehicles and notification messages are triggered by incidents around the vehicle(s) or in the vehicle(s).

The first vehicle (=node ID: S; lower car in FIG. 1) in the motorway detects the presence of ice Z in the road. This detection of ice Z represents important information that has to be forwarded to other vehicles. The reception of a hello message IM from a second vehicle (=node ID: A; higher car in FIG. 1), which indicates its presence, works as a trigger which induces the first car to send the event message EM (=warning message with message ID=M1; content: ice Z on the road; cf. FIG. 2) to the second car.

In the present invention, the nodes A, B, C, S (cf. FIG. 2) discover each other by means of so-called hello packets. A hello packet is designed for the purpose of discovery of nodes A, B, C, S and especially contains an identifier of the node A, B, C, S. Hello packets are well-known for the purpose of neighbour discovery, especially in routing protocols.

In contrast to many other protocols, in the present invention hello packets are not necessarily used for maintaining neighbourhood state information in each node A, B, C, S. This can be an optional addition in order to deliver notifications more quickly.

Assuming that no neighbourhood information is available in a considered device 100, the notification of an event is transmitted by a sender or transmitting unit 10 to the first node from which a hello packet is received, after the event has happened. In order to be sure that this node has received the notification by its receiving unit 20, the receiving node is expected to answer with an acknowledgement packet. The sending node will re-transmit the message each time it receives another hello message (which acts as a trigger) until that message is acknowledged.

In many applications, it is crucial that the sending device can be sure that the notification has been received. For this purpose, a storing unit 30 is provided in each device 100; this storing unit 30 stores information about all devices from which a hello packet has been received after the event has happened. Those devices 100, which have positively acknowledged the reception of the notification are distinguished from devices 100, which have been detected but did not yet receive the notification.

This discrimination can for instance be implemented by means of a table of notification status for node S (cf FIG. 2) as follows:

| message ID = M1 | | message ID = M2 | | message ID = M3 | |
|---|---|---|---|---|---|
| node ID | message status | node ID | message status | node ID | message status |
| A | 0 | A | 0 | A | 1 |
| B | 0 | B | 1 | B | 0 |
| C | 1 | C | 0 | C | 1 |

Different tables will be associated to different messages. Devices 100 marked with a "0" have sent a hello packet but did not yet receive the notification whereas devices marked with a "1" have already acknowledged the notification.

When a message is initially generated and forwarded, the sender (node S; cf. FIG. 2) creates an empty table relative to that message. Every time the node S receives a new hello message from a node which is not in the table or which is in the table but with a value equal to 0, the sender S forwards to that node all the messages it has not yet acknowledged.

So if for example the node B (=second node with ID=B; cf. FIG. 2) sends a hello message, the node S will send to the node B the messages M1 and M3. If then the node B sends the acknowledgement message AM relative to the message ID=M1, the above table will be updated so that the status of the node B for the message M1 is set to "1".

The information about a device 100 is kept in the table as long as the device 100 is still in transmit and receive range, i.e. as long as hello packets are received from this device 100. The maximum interval between two hello packets of the same device 100 can be known. Therefore, this maximum interval can be used as so-called lifetime of the entries in the table. In order to account for the possible loss of hello packets, the lifetime can also be chosen as a multiple of the maximum interval between two hello packets. The lifetime timer is started after the first hello packet from a considered device 100 has been received. If the timer expires, the entry in the table is deleted.

In many applications, it is useful or even required that devices 100, which have received a notification, forward this notification to other devices 100. In this case, it might be sufficient for the originator of the notification to send the notification to just a few devices 100, maybe to even just one other device 100, which will forward the information.

In the same way, it can be specified whether these other devices 100 forward the information to just a few devices 100 or to all devices 100 except the device from which the information was received. In case of mobile nodes A, B, C, S, it can be useful that a device 100 carries the information along with it, before re-transmitting it, or that the device 100 re-transmits the information periodically after a certain distance.

Finally, the present unicast method for event-triggered communication between and among a plurality of mobile nodes A, B, C, S (cf. FIG. 2) in the form of vehicles is explained by way of FIG. 3:

After an event notification EM regarding ice Z on the road has been received,

[i] firstly, the receiving means 20 of the device 100 listens to the identifying message IM of the first node A;

[ii] then, the identifying information of this specific node A from which the identifying message IM had been received is locally stored in the storing means 30 of the device 100;

[iii] then, the event notification EM is transmitted to the nodes B, C, and it is waited for a respective acknowledging notification AM;

[iv] then, it is locally stored in the storing means 30 of the device 100 for each of the nodes B, C whether an acknowledgement of a certain event notification EM had been received wherein it can be distinguished between different event notifications EM;

[v] in case no acknowledging notification AM has been received within a certain time-out period, the transmission is repeated; and

[vi] in case no identifying message IM has been received from these nodes B, C within a certain time period, in particular within a certain lifetime: finally, the identifying message IM is deleted, in particular the information regarding the nodes B, C is deleted.

As can be taken from FIG. 2, within the device 100 the transmitting means 10, the receiving means 20 and the storing means 30 are connected by a data bus 40 with each other.

LIST OF REFERENCE NUMERALS

| | |
|---|---|
| 100 | device |
| 10 | transmitting means or sender unit |
| 20 | receiving means or receiving unit |
| 30 | storing means or storing unit |
| 40 | bus, in particular data bus, connecting transmitting means or sender unit 10, receiving means or receiving unit 20 and storing means or storing unit 30 with each other |
| 200 | communication network or communication system, in particular arrangement for inter-node communication |
| A | first node |
| B | second node |
| C | third node |
| S | sending node |
| Z | ice on the road |
| AM | acknowledgement message or acknowledging notification |
| EM | event notification or warning message |
| IM | hello message or identifying message |

The invention claimed is:

1. A device for operating event-triggered communication among a plurality of nodes, the device comprising:
   at least one transmitter that sends at least one identifying message and at least one acknowledging notification to at least one specific node using unicast transmission; and
   at least one receiver that senses both the at least one identifying message and the at least one acknowledging notification.

2. The device according to claim 1, wherein the transmitter sends at least one event notification using unicast transmission separately for each specific node from which the at least one identifying message had been received.

3. The device according to claim 1, wherein the at least one receiver senses an event notification transmitted by at least one of the plurality of nodes.

4. The device according to claim 1, wherein the at least one transmitter sends the at least one acknowledging notification to a specific node from which the receiver sensed the at least one identifying message.

5. The device according to claim 1, further comprising:
   at least one storing device that stores the at least one identifying message and the at least one acknowledging notification.

6. The device according to claim 2, wherein the at least one transmitter resends the at least one event notification after the at least one receiver fails to sense the at least one acknowledging notification within a time-out period.

7. The device according to claim 6, wherein the time-out period is equal to a time period of the at least one identifying message.

8. A method for event-triggered communication among a plurality of vehicles, the method comprising:
   sending at least one identifying message and at least one acknowledging notification to at least one specific node, using unicast transmission;
   after at least one event notification had been received, receiving at least one identifying message of at least one of the plurality of nodes; and
   locally storing identifying information of the at least one specific node from which the at least one identifying message had been received.

9. The method according to claim 8, further comprising:
   transmitting the at least one event notification to at least one of the plurality of nodes and waiting for the at least one acknowledging notification;
   distinguishing each event notification for each node;
   locally storing for each of the plurality of nodes whether the at least one acknowledgement notification has been received;

resending the at least one acknowledging notification after no acknowledging notification has been received within a certain time-out period; and deleting the at least one identifying message within a certain time period.

10. The method according to claim 9, further comprising:
sending the at least one acknowledging notification to the at least one specific node from which the at least one identifying message has been received.

11. The method according to claim 9, further comprising:
transmitting the at least one event notification using unicast transmission separately for each specific node from which the at least one identifying message has been received.

12. The method according to claim 9, further comprising:
sending the received at least one event notification to a certain number of the plurality of nodes.

13. The method according to claim 9, further comprising:
sending the received at least one event notification to all nodes for which the received at least one identifying message is locally stored, the at least one acknowledging notification for the at least one event notification is not marked, except for a particular node from which the at least one event notification has been received.

14. The method according to claim 8, further comprising:
storing the at least one identifying message, on-demand.

15. The method according to claim 12, wherein the certain number of nodes to which the at least one event notification is sent depends on a number of identifying messages received from different nodes.

16. The method of claim 8, further comprising:
periodically sending hello messages in a wireless vehicle-to-vehicle communication network.

17. The method of claim 16, further comprising:
automatically sending warning messages in the periodic hello messages.

18. The method of claim 17, further comprising:
sensing, with a first vehicle, ice on a road; and
sending, from the first vehicle to other vehicles, an ice warning message.

19. The method of claim 17, further comprising:
continuing to send the warning messages until receiving the at least one acknowledging notification that corresponds to the sent warning messages.

20. The method of claim 17, further comprising:
sending warning messages periodically after a certain distance.

* * * * *